United States Patent
Kallo et al.

(10) Patent No.: US 7,829,228 B2
(45) Date of Patent: Nov. 9, 2010

(54) CONTROL STRATEGY TO PREVENT HUMIDITY CYCLING IN A FUEL CELL

(75) Inventors: Josef Kallo, Stuttgart (DE); Kilian Simbeck, Berlin (DE); Peter Kilian, Heidelberg (DE); Oliver Maier, Worms (DE); Manish Sinha, Pittsford, NY (US); Steven D. Burch, Honeoye Falls, NY (US); John P. Salvador, Penfield, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1089 days.

(21) Appl. No.: 11/466,813

(22) Filed: Aug. 24, 2006

(65) Prior Publication Data

US 2008/0050626 A1 Feb. 28, 2008

(51) Int. Cl.
*H01M 8/04* (2006.01)
(52) U.S. Cl. ............... 429/430; 429/428; 429/431; 429/432; 320/101; 320/137
(58) Field of Classification Search .......... None
See application file for complete search history.

(56) References Cited

U.S. PATENT DOCUMENTS

2003/0091882 A1* 5/2003 Schmidt et al. ............. 429/23
2007/0141412 A1   6/2007 Becker et al.
2007/0284166 A1* 12/2007 Maier et al. ............... 180/65.3

FOREIGN PATENT DOCUMENTS

DE    10 2007 038172 A1   3/2008

* cited by examiner

*Primary Examiner*—Jonathan Crepeau
*Assistant Examiner*—Tony Chuo
(74) *Attorney, Agent, or Firm*—John A. Miller; Miller IP Group, PLC

(57) ABSTRACT

A system and method for reducing RH cycling of the membranes in a fuel cell stack. A control algorithm damps a power request signal using a first order filter during low power transients so that the fuel cell stack continues generating power at a higher rate than is requested. The excess power generated by the stack is used to recharge a battery in the fuel cell system. The damped power signal is weighted so that more fuel cell stack power is provided for a low battery state of charge unless stack power is provided for a high battery state of charge.

19 Claims, 3 Drawing Sheets

CONTROL STRATEGY TO PREVENT HUMIDITY CYCLING IN A FUEL CELL

BACKGROUND OF THE INVENTION

1. Field of the Invention

This invention relates generally to a system and method for controlling relative humidity (RH) cycling in a fuel cell stack and, more particularly, to a system and method for controlling RH cycling during low power transients of a fuel cell stack that includes damping the power request, and using the extra stack power to charge a battery.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system is limited. Further, the time delay from system start-up to driveability and low acceleration of the vehicle may not be acceptable. During a drive cycle, the stack cell voltage varies because the variable driver power request follows the stack polarization curve. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

FIG. 1 is a schematic block diagram of a fuel cell system 10 including a fuel cell stack 12 and a battery 14 that includes power electronics. In order to provide battery charge or discharge, a voltage difference is needed between the stack voltage and the battery voltage that is greater than or equal to the battery charge. When the stack voltage is greater than the battery voltage, the power electronics operates as a voltage amplifier where the gain is less than or equal to one. The fuel cell stack 12 provides electrical power to a high voltage bus line, represented here as positive bus line 16 and negative bus line 18. In a vehicle fuel cell system, the fuel cell stack 12 may include about 400 fuel cells. The battery 14 is also coupled to the high voltage bus lines 16 and 18, and provides supplemental power as discussed above. A compressor 30 provides cathode input air to the stack 12 on inlet line 32. A flow meter 34 measures the flow of the cathode input air to the stack 12.

The fuel cell system 10 includes a power inverter module (PIM) 22 electrically coupled to the bus lines 16 and 18 and an AC or DC traction motor 24. The PIM 22 converts the DC voltage on the bus lines to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction motor 24 is operating as a generator, electrical AC power from the motor 24 is converted to DC power by the PIM 22, which is then applied to the bus lines 16 and 18 to recharge the battery 14. A blocking diode (not shown) prevents the regenerative electrical energy applied to the bus lines 16 and 18 from flowing into the fuel cell stack 12, which could otherwise damage the stack 12.

For a typical hybrid vehicle strategy, the battery 14 is mainly used to increase efficiency, lower the dynamic requirements of the fuel cell system, and/or increase the performance of the vehicle. If the traction motor 24 demands more power, the battery 14 can provide the stored energy to the motor 24 very fast.

During low power transients when the requested output load on the fuel cell stack goes from a high power output to a low power output, the reactant gas flow for the anode and cathode side of the stack reacts accordingly to reduce the flow. The flow of the hydrogen to the stack can be reduced very quickly, on the order of about 100 milliseconds, in response to the reduced power demand. However, the compressor providing the cathode air is a relatively large machine having a high inertia that takes a few seconds to reduce the cathode reactant air flow. During the low power transients, the amount of product water produced by the fuel cell stack will be significantly reduced as a result of the low flow of hydrogen. However, the continued cathode airflow through the stack as a result of compressor inertia will have a drying effect on the membranes, which produces drying and subsequent RH cycling of the membranes during low power transients. Membrane RH cycling causes the membrane to expand and contract as a result of the absorption of water and subsequent drying. This expansion and contraction in the membrane causes pin holes in the membrane, which create hydrogen and oxygen cross-over through the membrane creating hot spots that further increase the size of the hole in the membrane, thus reducing its life. This RH cycling is a major reason for premature MEA failures in fuel cell stacks. Therefore, it is desirable to reduce RH cycling in the fuel cell stack.

SUMMARY OF THE INVENTION

In accordance with the teachings of the present invention, a system and method are disclosed for reducing RH cycling of the membranes in a fuel cell stack during low power transients. A control algorithm damps the driver power request using a first order filter, so that the rate at which the hydrogen reactant gas is provided to the fuel cell stack is slowly reduced and the hydrogen/air reaction in the stack continues to produce product water. The power generated by the stack at low load is used to recharge a battery in the fuel cell system. The damped power signal is weighted so that more fuel cell stack power is provided for a low battery state of charge and less fuel cell stack power is provided for a high battery state of charge.

In accordance with another embodiment of the present invention, an algorithm is employed to maintain stack power as the compressor is decreasing during a low power transient. The algorithm commands the compressor to a desired speed for the required current density for the low power request. A flow meter measures the flow of the compressor air as it is reducing speed, and the algorithm calculates a cathode feedback stoichiometry based on the required current density and the measured flow of air. The cathode feedback stoichiometry, the desired stoichiometry for the low power request and the current density are used to calculate the stack current density that will provide stack power commensurate with the decreasing speed of the compressor until it reaches the current density command. The excess energy generated by the stack is used to recharge the battery.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a control scheme for reducing RH cycling in a fuel cell stack associated with a hybrid fuel cell hybrid system is merely exemplary in nature, and is no way intended to limit the invention or its applications or uses.

Figure 1:
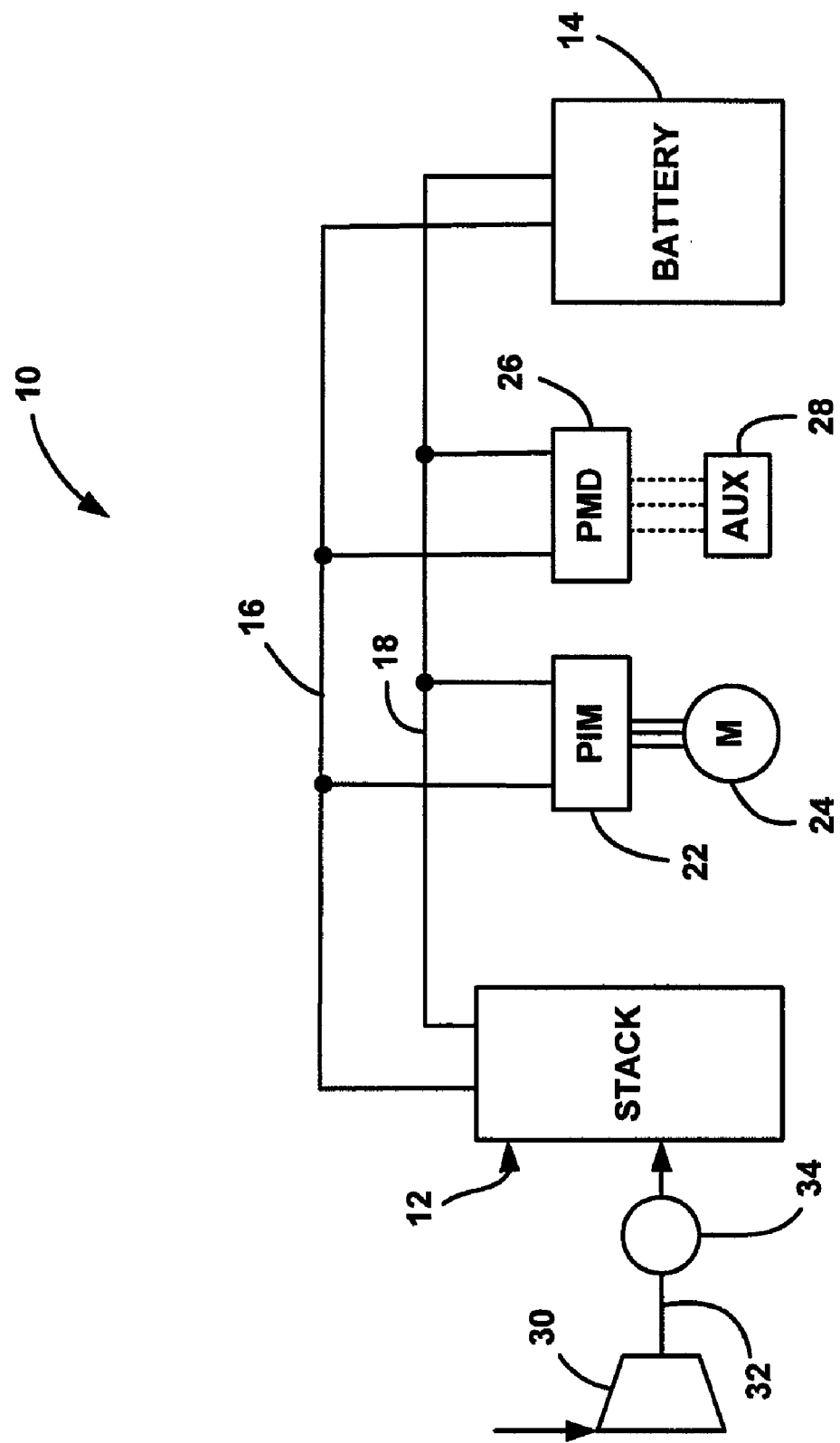
FIG. 1 is a schematic block diagram of a hybrid fuel cell system.
Figure 2:
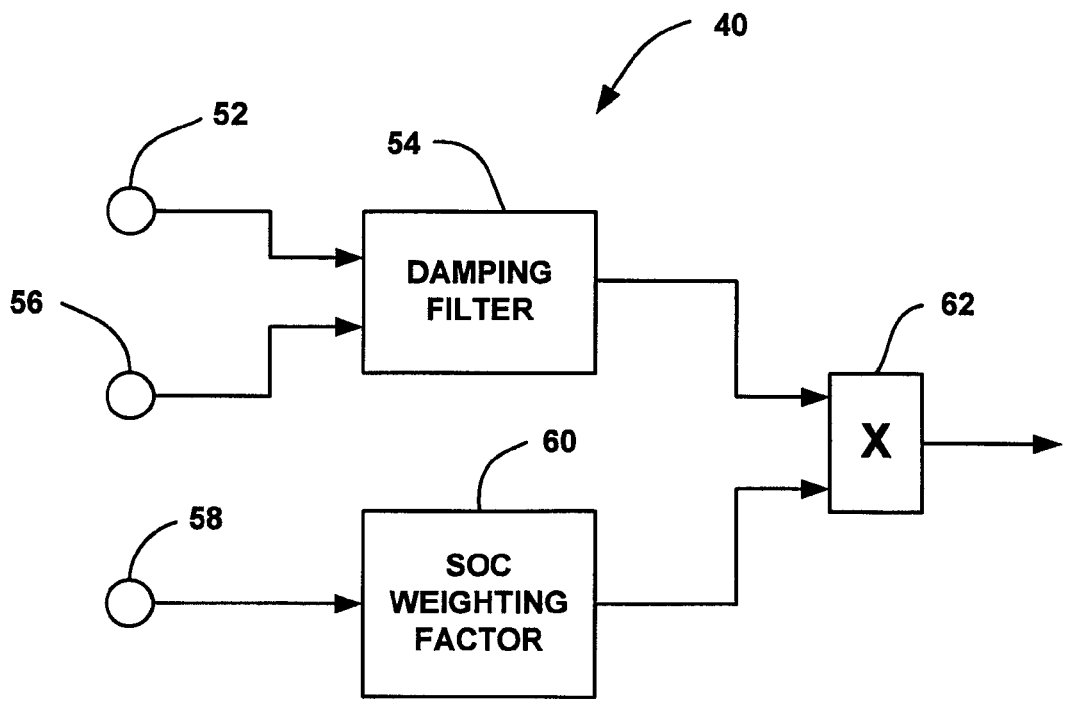
FIG. 2 is a block diagram for a control scheme for controlling the power requirements of a fuel cell stack during low power transients to reduce RH cycling of the stack, according to an embodiment of the present invention.

FIG. 2 is a schematic block diagram 50 showing a control scheme for reducing relative humidity cycling in the fuel cell stack 12. A driver power request is provided at input node 52, and is applied to a variable first order damping filter 54. The first order filter 54 operates as a damping function that reduces the driver power request so that it is more slowly reduced during low power transients, such as from 50 kW to 10 kW. For example, if the vehicle operator is driving along a highway, and suddenly wishes to break to an idle power demand, the driver request signal at the input node 52 may be reduced quickly. As discussed above, the flow of the hydrogen can be quickly reduced, but the cathode airflow from the compressor 30 has a slow response time, which results in drying of the membranes in the stack 12. By damping the power request from the driver using the filter 54, the fuel cell stack 12 will continue producing power at a slower reduced rate, which produces product water, so that the response time of the compressor 30 does not cause air to dry out the membranes in the stack 12. A set-point signal at input node 56 adjusts the damping factor of the filter 54 so that different damping requirements are provided depending on the degree of the lower power transient.

Because the fuel cell stack 12 would generate more power than is requested by the driver during the damping operation provided by the filter 54, it is desirable to use that power for useful purposes, if possible. According to the invention, the extra power generated by the fuel cell stack 12 during the damping procedure is used to charge the battery 14. A battery state of charge (SOC) signal at input node 58 is provided to a state of charge weighting factor look-up table 60 that provides a weighting factor depending on the state of charge of the battery 14. For a higher battery SOC, the weighting factor would be smaller and for a lower battery SOC, the weighting factor would be larger. The weighting factor from the look-up table 60 is multiplied by the damped power demand signal from the filter 54 by a multiplier 62 to provide the actual power demand to the fuel cell stack 12.

Figure 3:
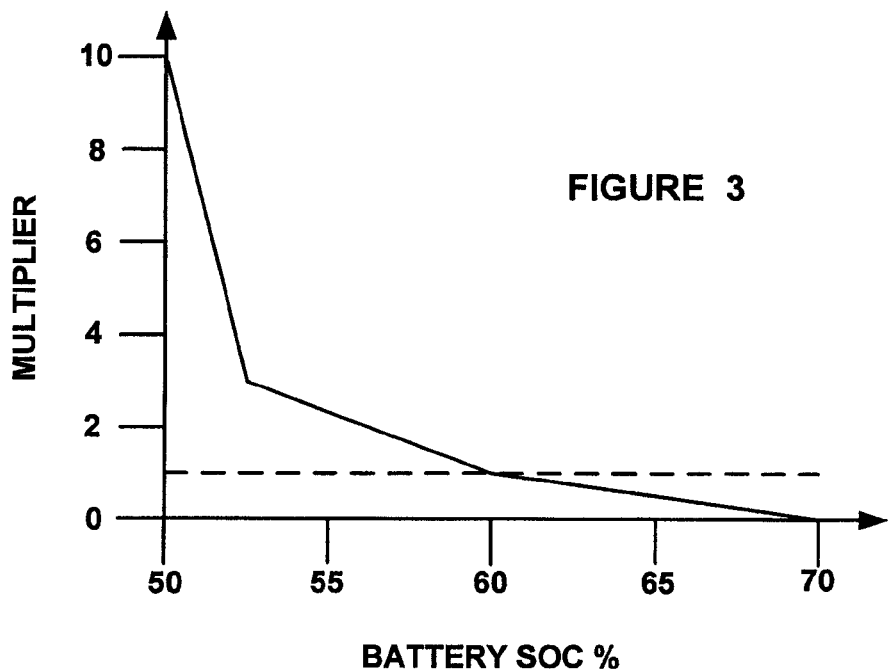
FIG. 3 is a graph with battery state of charge on the horizontal axis and a multiplier on the vertical axis showing a state of charge weighting factor for controlling the battery charging at low power transients, according to an embodiment of the present invention.

FIG. 3 is a graph with battery SOC percentage on the horizontal axis and a multiplier factor (weighting factor) on the vertical axis showing a representative example for the weighting factor look-up table 60. An optimal battery SOC is selected for a particular system based on experimentation and other factors. In this example, the optimal battery SOC is about 60%. When the battery SOC is 60%, then the multiplier factor is 1 and the damped power request from the filter 54 is passed through the multiplier 62 unchanged. The extra power provided by the stack 12 above the requested power provided by the damping filter 54 will be used to charge the battery 14 so that the battery SOC will go slightly above the optimal battery SOC. If the battery SOC is less than 60%, then the multiplier factor is greater than 1 so that the power demand signal is greater than the damped power request to provide a higher power request for increased battery charging to more quickly charge the battery 14 to the optimal battery SOC. If the battery SOC is greater than 60%, then the multiplier factor is less than 1, which reduces the damped power demand signal from the filter 54 in the multiplier 62. In this condition, the hydrogen flow will be shut off quicker than the compressor flow, and may provide some membrane drying.

Figure 4:
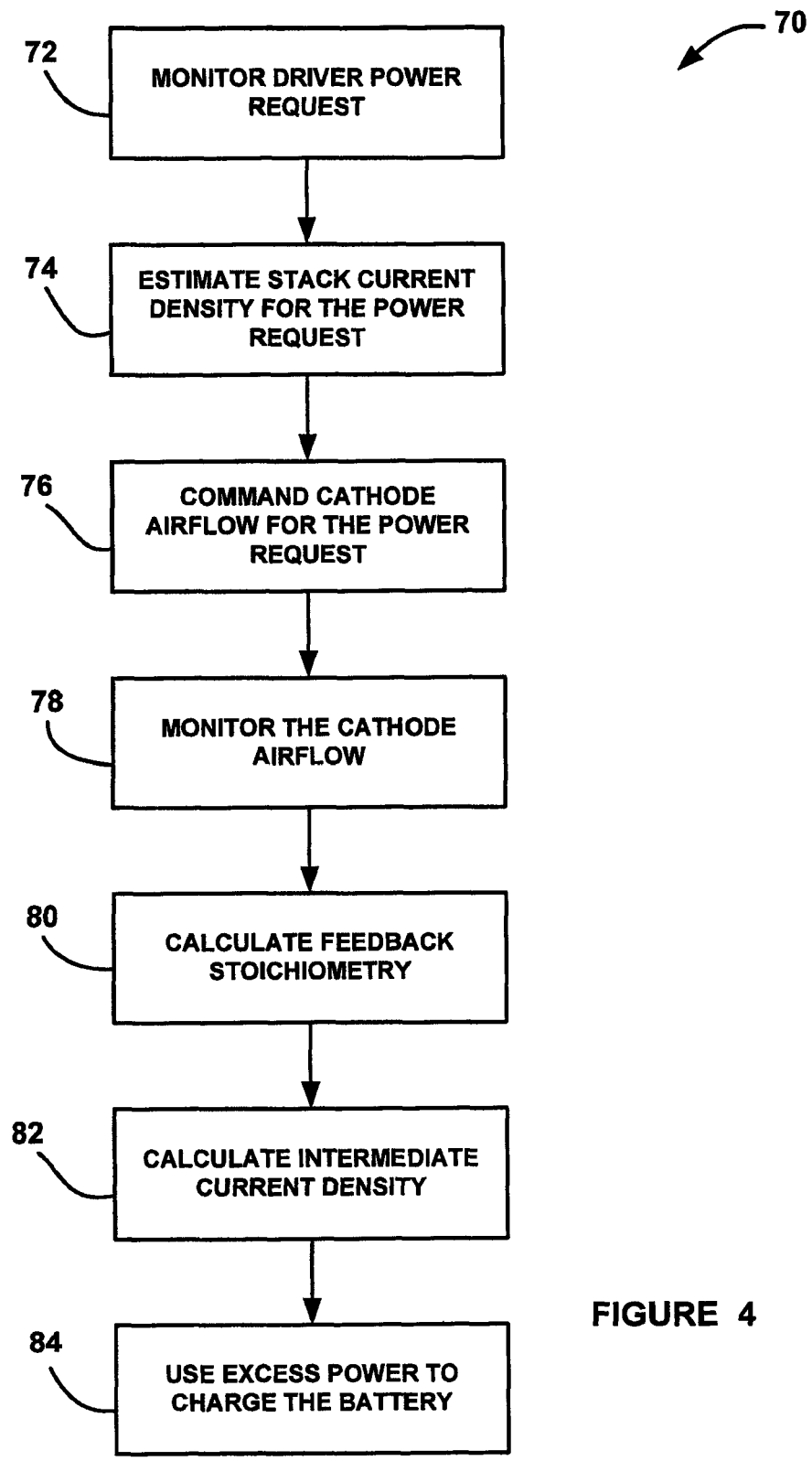
FIG. 4 is a flow chart diagram showing a process for calculating fuel cell stack power during a low power transient, according to another embodiment of the present invention.

FIG. 4 is a flow chart diagram 70 showing a process for reducing RH cycling of the membranes in the fuel cell stack 12 during low power transients, according to another embodiment of the present invention. The algorithm monitors a driver power request signal P_req at box 72. The algorithm estimates the stack current density request j_req for the power request based on a stack polarization curve at box 74. The algorithm then commands a cathode air flow signal dm_air- _req that would satisfy the current density request j_req at box 76. For low power transients, the algorithm monitors the cathode air flow through the flow meter 34 as the compressor speed is reduced to achieve the air flow dm_air_req at box 78. As discussed above, it will take some time for the compressor 30 to get to the air flow required for the low power during a low power transient.

As the speed of the compressor 30 decreases, the algorithm calculates a cathode feedback stoichiometry stoich_fb based on the current density request j_req at box 80 and the flow of air to the stack 12 using, for example, the equation:

$$\text{stoich\_fb} = \text{j\_req} \frac{\text{molar\_flow\_air}}{2.38 * \frac{\text{j\_req} * \text{cell\_area}}{2F}} \quad (1)$$

Where molar_flow_air is the molar flow rate of air through the flow meter 34 converted from mass flow, cell_area is the area of the membrane in each fuel cell and F is Faradays constant.

The algorithm then calculates an intermediate current density j_star that will maintain the cathode stoichiometry at the set-point for the current density request j_req at box 82 using, for example, the equation:

$$\text{j\_star} = \text{j\_req} * \frac{\text{stoich\_fb}}{\text{stoich\_desired}} \quad (2)$$

The stack 12 produces output power for the intermediate current density j_star for the current compressor speed. Hydrogen will continue flowing to the stack 12 to satisfy the changing current density j_star as the compressor speed is reduced. The algorithm performs these calculations continuously during the low power transient until the compressor speed reaches the air flow demand dm_air_req. The excess power that is generated by the stack 12 during the low power transient can be used to charge the battery 14 at box 84, as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack;
   a power source; and
   a controller, responsive to a power request signal, said controller including a damping filter that damps the power request signal over a damping time during a low power transient and provides a damped power demand signal to the fuel cell stack that provides more power than the power request signal during the damping time; and
   wherein the controller is further responsive to a power source state of charge signal, said controller including a state of charge weighting factor look-up table that provides a state of charge multiplier factor depending on the power source state of charge, said controller multiplying the weighting factor by the damped power demand signal to increase or decrease the damped power demand signal depending on the state of charge of the power source, wherein excess power generated by the fuel cell stack above the power request signal is used to charge the power source.

2. The system according to claim 1 wherein the multiplier factor is 1 if the power source state of charge is at an optimal state of charge, is greater than 1 if the power source state of charge is below the optimal state of charge and is less than 1 if the power source state of charge is greater than the optimal state of charge.

3. The system according to claim 1 wherein the state of charge weighting factor look-up table increases the damped power demand signal if the power source state of charge is less than an optimal state of charge and decreases the damped power demand signal if the power source state of charge is greater than the optimal state of charge.

4. The system according to claim 3 wherein the optimal state of charge is about 60%.

5. The system according to claim 1 wherein the controller further includes a filter set-point that sets the damping of the damping filter based on the amount of the power transient.

6. The system according to claim 1 wherein the damping filter is a first order filter.

7. The system according to claim 1 wherein the power source is a battery.

8. The system according to claim 1 wherein the system is on a hybrid fuel cell vehicle.

9. A hybrid fuel cell system comprising:
   a fuel cell stack;
   a battery; and
   a controller responsive to a power request signal and a battery state of charge signal, said controller including a damping filter that damps the power request signal over a damping time during a low power transient and provides a damped power demand signal that provides more power than the power request signal during the damping time, said controller further including a state of charge weighting factor look-up table that provides a multiplier factor depending on the battery state of charge, said controller multiplying the weighting factor by the damped power demand signal to increase or decrease the damped power demand signal depending on the state of charge of the battery, wherein excess power generated by the fuel cell stack above the power request signal is used to charge the battery.

10. The system according to claim 9 wherein the multiplier factor is 1 if the battery state of charge is at an optimal state of charge, is greater than 1 if the battery state of charge is below the optimal state of charge and is less than 1 if the battery state of charge is greater than the optimal state of charge.

11. The system according to claim 9 wherein the state of charge weighting factor look-up table increases the damped power demand signal if the battery state of charge is less than an optimal state of charge and decreases the damped power demand signal if the battery state of charge is greater than the optimal state of charge.

12. The system according to claim 11 wherein the optimal state of charge is 60%.

13. The system according to claim 9 wherein the controller further includes a filter set-point that sets the damping of the damping filter based on the amount of the power transient.

14. The system according to claim 9 wherein the damping filter is a first order filter.

15. A method for providing a power demand signal to a fuel cell stack in a fuel cell system, said method comprising:
   operating the fuel cell stack at a higher power than a desired power request during a low power transient, wherein operating the fuel cell stack includes damping a power request signal during the low power transient over a damping time so that the fuel cell stack provides more power than the power request signal during the damping time, and weighting the damped power request signal depending on the state of charge of the battery, wherein weighting the damped power request signal includes multiplying the damped power request signal by a value greater than 1 if the battery state of charge is less than an optimal state of charge and multiplying the power request signal by a value less than 1 if the battery state of charge is greater than the optimal state of charge; and using the excess stack power to charge a battery.

16. The method according to claim 15 wherein damping the power request signal includes using a first order filter.

17. The method according to claim 15 wherein damping the power request signal includes changing a filter set-point that sets the damping of a damping filter depending on the amount of the power transient.

18. The method according to claim 15 wherein operating the fuel cell stack at a higher power than a desired power request includes providing a command to a compressor to provide an air flow required for a desired current density that provides a desired power request, calculating a cathode feedback stoichiometry based on the desired current density and the flow of air through a flow meter, calculating an intermediate current density that will maintain the cathode stoichiometry at a set-point for the desired current density, and causing the fuel cell stack to generate the intermediate current density.

19. The method according to claim 18 wherein calculating an intermediate current density includes continually calculating the intermediate current density based on the cathode air flow to the stack as the compressor decreases in speed during the low power transient.

* * * * *